(12) United States Patent
Zeiner et al.

(10) Patent No.: US 8,146,370 B2
(45) Date of Patent: Apr. 3, 2012

(54) TURBINE DRIVE SYSTEM WITH LOCK-UP CLUTCH AND METHOD

(75) Inventors: Peter Kenneth Zeiner, Scottsdale, AZ (US); Tony Libera, Tempe, AZ (US); Todd Langston, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1187 days.

(21) Appl. No.: 12/124,362

(22) Filed: May 21, 2008

(65) Prior Publication Data

US 2009/0288421 A1 Nov. 26, 2009

(51) Int. Cl.
*F02C 3/10* (2006.01)
*F02C 6/00* (2006.01)

(52) U.S. Cl. ............ 60/792; 60/802; 60/778; 60/786

(58) Field of Classification Search .............. 60/792, 60/39.163, 802, 782, 785, 795, 39.183, 791, 60/786, 787, 788, 778
See application file for complete search history.

(56) References Cited

U.S. PATENT DOCUMENTS

| | | | | |
|---|---|---|---|---|
| 3,719,093 A | | 3/1973 | Edmonds | |
| 3,769,790 A | * | 11/1973 | Thebert | 60/39.08 |
| 3,771,916 A | * | 11/1973 | Flanigan et al. | 417/319 |
| 4,041,696 A | * | 8/1977 | Morrison | 60/790 |
| 4,062,186 A | * | 12/1977 | Snow et al. | 60/226.1 |
| 5,125,597 A | * | 6/1992 | Coffinberry | 244/118.5 |
| 5,137,230 A | * | 8/1992 | Coffinberry | 244/118.5 |
| 5,184,526 A | | 2/1993 | Watanabe | |
| 5,363,641 A | * | 11/1994 | Dixon et al. | 60/778 |
| 5,694,765 A | * | 12/1997 | Hield et al. | 60/39.163 |
| 5,845,483 A | * | 12/1998 | Petrowicz | 60/788 |
| 6,305,156 B1 | * | 10/2001 | Lui | 60/785 |
| 7,013,636 B2 | * | 3/2006 | Iya et al. | 60/204 |
| 7,086,514 B2 | * | 8/2006 | Langston | 192/46 |
| 7,246,482 B2 | * | 7/2007 | Mahoney et al. | 60/204 |
| 7,285,871 B2 | * | 10/2007 | Derouineau | 290/52 |
| 7,478,525 B2 | * | 1/2009 | Iya et al. | 60/204 |
| 7,481,062 B2 | * | 1/2009 | Gaines et al. | 60/792 |
| 7,552,582 B2 | * | 6/2009 | Eick et al. | 60/39.163 |
| 7,584,600 B2 | * | 9/2009 | Klingels | 60/39.183 |
| 7,690,185 B2 | * | 4/2010 | Linet et al. | 60/39.163 |
| 7,758,302 B2 | * | 7/2010 | Linet et al. | 415/68 |
| 7,805,947 B2 | * | 10/2010 | Moulebhar | 60/787 |
| 7,823,391 B2 | * | 11/2010 | Beardsley | 60/788 |
| 7,882,691 B2 | * | 2/2011 | Lemmers et al. | 60/39.163 |
| 2006/0010875 A1 | * | 1/2006 | Mahoney et al. | 60/772 |
| 2007/0022735 A1 | * | 2/2007 | Henry et al. | 60/39.162 |

(Continued)

*Primary Examiner* — William Rodriguez
(74) *Attorney, Agent, or Firm* — Ingrassia Fisher & Lorenz, P.C.

(57) ABSTRACT

A pneumatically driven turbine drive system is coupled to a gas turbine engine that includes low and high pressure compressors, low and high pressure turbines, a lock-up clutch, and at least one engine accessory driven by the high pressure compressor. The pneumatically driven turbine drive system selectively bleeds air discharged from the high pressure compressor and supplies it to an air turbine that is coupled to the at least one engine accessory. Thus, the system selectively reduces the power extracted from the high pressure compressor and is capable of supplying power back to the engine core. This, coupled with the bleed air that is diverted from the high pressure turbine and the low pressure turbine, allows the high pressure spool and the low pressure spool to run at lower speeds when high engine thrust is not needed or desired, but when the at least one engine accessory is still needed.

11 Claims, 1 Drawing Sheet

U.S. PATENT DOCUMENTS

2008/0072568 A1*  3/2008  Moniz et al. .................. 60/226.1
2009/0314002 A1* 12/2009  Libera et al. .................... 60/778
2010/0170262 A1*  7/2010  Kaslusky et al. ............... 60/778
2010/0314877 A1* 12/2010  Finney ............................ 290/52

* cited by examiner

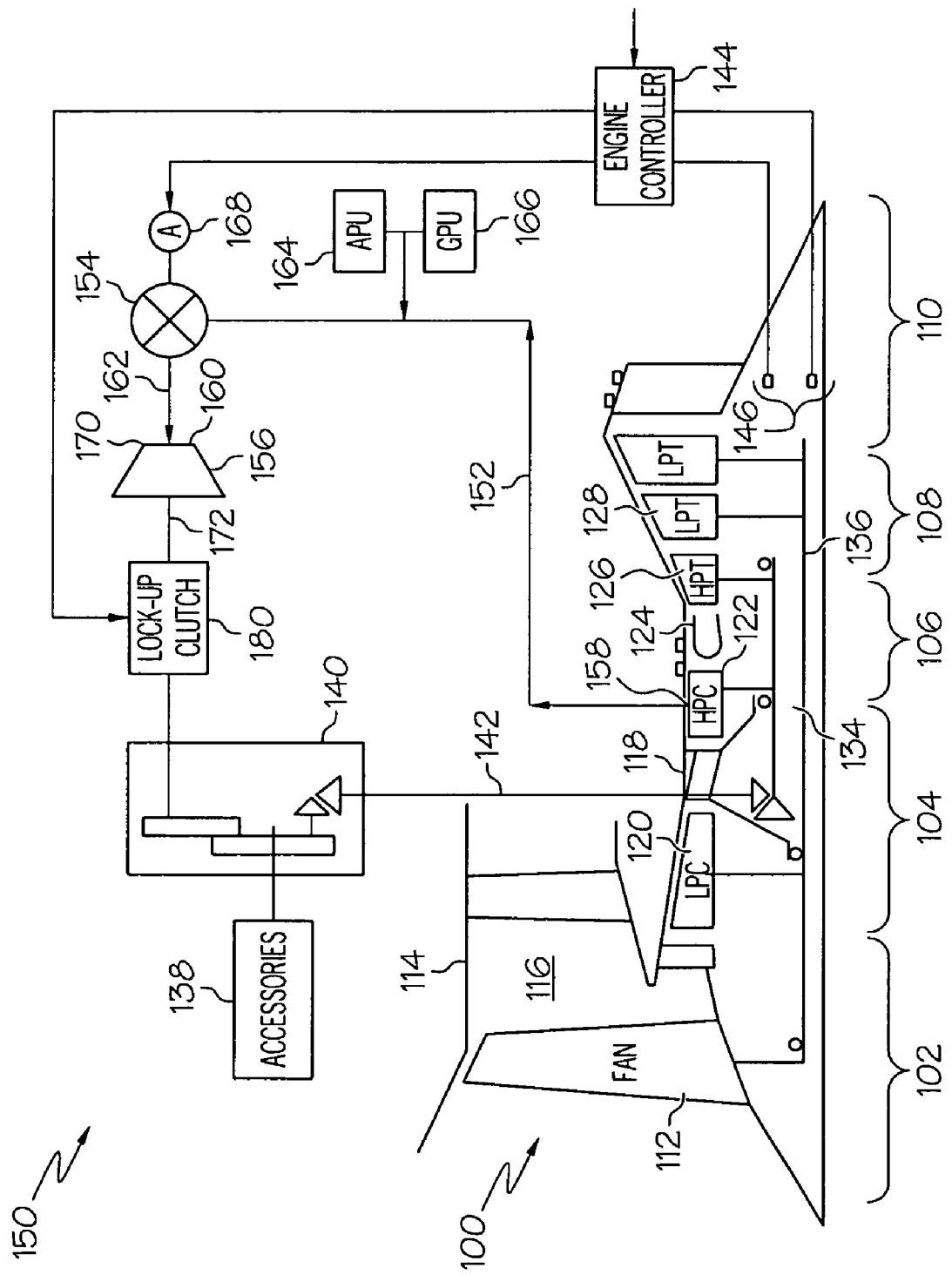

TURBINE DRIVE SYSTEM WITH LOCK-UP CLUTCH AND METHOD

TECHNICAL FIELD

The present invention relates to gas turbine engines and, more particularly, to a gas turbine engine drive system including a lock-up clutch and method for extracting fluid power from the gas turbine engine and converting it to mechanical power in a gearbox.

BACKGROUND

A gas turbine engine may be used to supply power to various types of vehicles and systems. For example, gas turbine engines may be used to supply propulsion power to an aircraft. Many gas turbine engines include at least three major sections, a compressor section, a combustor section, and a turbine section. The compressor section receives a flow of intake air and raises the pressure of this air to a relatively high level. In a multi-spool (e.g., multi-shaft) engine, the compressor section may include two or more compressors. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is then exhausted from the engine. Similar to the compressor section, in a multi-spool engine the turbine section may include a plurality of turbines. The energy generated in each of the turbines may be used to power other portions of the engine.

In addition to providing propulsion power, a gas turbine engine may also be used to supply either, or both, electrical and pneumatic power to the aircraft. For example, in the past some gas turbine engines include a bleed air port between the compressor section and the turbine section. The bleed air port allows some of the compressed air from the compressor section to be diverted away from the turbine section, and used for other functions such as, for example, main engine starting air, environmental control, and/or cabin pressure control. More recently, however, gas turbine engines are being designed to not include bleed air ports. This is in response to a desire to more fully utilize electrical power for main engine starting air, environmental control, and cabin pressure control. Thus, instead of using bleed air to support these various functions, the high pressure turbine may be used to drive one or more electrical generators to supply electrical power to support these functions.

Accordingly, the next generation of aircraft may be more electric in architecture. This reliance on electric power may increase the generator load and therefore shaft horsepower (SHP) extraction load on the high pressure (HP) spool of the propulsion engine (SHP load/thrust ratio is increasing). As a result, the engine may not be able to keep up with the generator load demand at various low thrust conditions in the flight envelope. As a result, the engine may be required to run at high core speeds and surge bleed to reduce engine thrust.

In a typical turbine engine, the turbine drive system (TDS) may extract pneumatic power from the aircraft bleed air system, including surge bleed, convert it into mechanical power and supply the power back into the engine accessory gearbox via a rotating shaft. This process in effect may off-set a portion of the electrical load. The generation of this mechanical power may provide gearbox power assistance during periods of engine operation throughout the engine operating speed range. During aircraft operation, peak power from the TDS may typically be demanded at speeds ranging from idle to maximum power (roughly between 60-100% engine speed). This power assistance may offset engine core power required to drive a number of engine accessory gearbox mounted accessories (generators, pumps, etc.). The TDS may be powered by a controlled supply of pneumatic energy from the engine itself (high, low, or intermediate stage, etc.) or from an external source such as an auxiliary power unit (APU), ground power unit (GPU), or another engine, via the aircraft's pneumatic distribution system.

The TDS requires both mechanical fixation when in the energized mode (TDS control valve open) and mechanically disengagement when deenergized. More specifically, when energized, the TDS must be capable of responding to fast changes in engine speed (engine accelerations/decelerations, i.e. Bode's) which is best served by a mechanically fixed turbine drive. When not energized, the TDS must be capable of mechanically disengagement to allow the drive turbine to come to rest. This mechanical disengagement may result in the prevention of turbine overheating, and wear with respect to bearings, gears and seals in the TDS, and improve engine performance.

Hence, there is a need for a TDS that is capable of responding to engine accelerations and decelerations when required via mechanical engagement to the engine core and disengagement when not in use. The system should not significantly reduce engine efficiency, and/or significantly increase fuel consumption, and/or increase overall operational costs. The present invention addresses one or more of these needs.

BRIEF SUMMARY

The present invention provides a gas turbine engine including a turbine drive system and method.

In one embodiment, and by way of example only, a gas turbine engine including a turbine drive system comprises an engine case; a low pressure compressor, a high pressure compressor, a high pressure turbine and a low pressure turbine disposed in flow series within the engine case. The high pressure compressor and the high pressure turbine are mounted on a high pressure spool and the low pressure compressor and the low pressure turbine are mounted on a low pressure spool. Each spool is rotationally mounted within the engine case. At least one engine accessory has an input shaft coupled to the high pressure spool to receive a drive force therefrom. The drive system further includes a bleed air conduit having an inlet port, an outlet port, and a flow passage therebetween. The bleed air conduit inlet port is fluidly coupled to the high pressure compressor to receive a flow of bleed air from the high pressure compressor. A flow control valve is mounted on the bleed air conduit and selectively movable between at least a closed position, in which the bleed air conduit inlet port is fluidly isolated from the bleed air conduit outlet port, and an open position, in which the bleed air conduit inlet port is in fluid communication with the bleed air conduit outlet port. The system further comprises an air turbine having a fluid inlet and a rotationally mounted air turbine output shaft. The air turbine fluid inlet is in fluid communication with the bleed air conduit outlet port to receive bleed air therefrom when the flow control valve is in the open position. The air turbine output shaft is coupled to the at least one engine accessory. The system further includes a lock-up clutch coupled between the air turbine output shaft and the at least one engine accessory and movable between (i) an engage position, in which the air turbine output shaft is coupled to the at least one engine accessory in a first rotational direction and a second rotational direction opposite the first rotational direction, and (ii) a disengage position, in which the air turbine output shaft is not coupled to the at least one engine accessory.

In another particular embodiment, and by way of example only, there is provided a gas turbine engine including a turbine drive system, comprising: an engine case; a low pressure compressor, a high pressure compressor, a high pressure turbine and a low pressure turbine disposed in flow series within the engine case, an engine accessory gearbox, at least one engine accessory, a bleed air conduit, a flow control valve mounted on the bleed air conduit, an air turbine, and a lock-up clutch. The high pressure turbine and the high pressure compressor are mounted on a high pressure spool, and the low pressure compressor and the low pressure turbine are mounted on a low pressure spool, each spool rotationally mounted within the engine case. The engine accessory gearbox includes an input shaft coupled to the high pressure spool to receive a drive force therefrom and operable, upon receipt of the drive force. The at least one engine accessory includes an input shaft coupled to the engine accessory gearbox to receive the drive force therefrom and operable, upon receipt of the drive force. The bleed air conduit includes an inlet port, an outlet port, and a flow passage therebetween. The bleed air conduit inlet port is fluidly coupled to the high pressure compressor to receive a flow of bleed air from the high pressure compressor. The flow control valve is selectively movable between at least a closed position, in which the bleed air conduit inlet port is fluidly isolated from the bleed air conduit outlet port, and an open position, in which the bleed air conduit inlet port is in fluid communication with the bleed air conduit outlet port. The air turbine includes a fluid inlet and a rotationally mounted output shaft. The air turbine fluid inlet is in fluid communication with the bleed air conduit outlet port to receive bleed air therefrom when the flow control valve is in the open position. The air turbine output shaft is coupled to the at least one engine accessory. The lock-up clutch is coupled between the air turbine output shaft and the engine accessory gearbox and movable between (i) an engage position, in which the air turbine output shaft is coupled to the engine accessory gearbox, and (ii) a disengage position, in which the air turbine output shaft is not coupled to the engine accessory gearbox.

In yet another particular embodiment, and by way of example only, there is provided a gas turbine engine system including a low pressure compressor, a high pressure compressor, a high pressure turbine, a low pressure turbine, and at least one engine accessory coupled to the high pressure compressor to receive a drive force therefrom, a method of providing a pneumatically driven turbine drive system to the high pressure compressor, comprising the steps of: determining an operational state of the gas turbine engine system; and selectively supplying air discharged from the high pressure compressor to an air turbine that is coupled to the at least one engine accessory based at least in part on the determined operational state, whereby the air turbine rotates and supplies the drive force to the at least one engine accessory in addition to that provided by the high pressure compressor.

Other independent features and advantages of the preferred turbine drive system and method will become apparent from the following detailed description, taken in conjunction with the accompanying drawings which illustrate, by way of example, the principles of the invention.

BRIEF DESCRIPTION OF THE DRAWING

FIG. 1 is a simplified schematic representation of an exemplary turbo-fan gas turbine engine that includes a turbine drive system including a lock-up clutch according to an embodiment.

DETAILED DESCRIPTION OF A PREFERRED EMBODIMENT

Before proceeding with the detailed description, it is to be appreciated that the following detailed description is merely exemplary in nature and is not intended to limit the invention or the application and uses of the invention. In this regard, it is to be additionally appreciated that the described embodiment is not limited to use in conjunction with a particular type of turbine engine. Hence, although the present embodiment is, for convenience of explanation, depicted and described as being implemented in a multi-spool gas turbine jet engine, it will be appreciated that it can be implemented in various other types of turbines, and in various other systems and environments. Furthermore, there is no intention to be bound by any theory presented in the preceding background or the following detailed description.

A simplified representation of an exemplary multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 (shown only partially in FIG. 1) disposed between the fan case 114 and an engine case 118, and provides a forward thrust. The remaining fraction of air exhausted from the fan 112 is directed into the compressor section 104.

The compressor section 104 includes two compressors, a low pressure compressor 120, and a high pressure compressor 122. The low pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, a plurality of non-illustrated fuel injectors, and one or more non-illustrated igniters, the high pressure air is mixed with fuel and combusted. The combusted air is then directed into the turbine section 108.

The turbine section 108 includes two turbines, a high pressure turbine 126 and a low pressure turbine 128, disposed in axial flow series in the engine case 118. The combusted air from the combustion section 106 expands through each turbine 126 and 128, causing each to rotate. The air is then exhausted through a propulsion nozzle disposed in the exhaust section 110, providing addition forward thrust. As the turbines 126 and 128 rotate, each drives equipment in the engine 100 via concentrically disposed shafts or spools. For example, the low pressure turbine 128 drives the fan 112 and the low pressure compressor 120 via a low pressure spool 136, and the high pressure turbine 126 drives the high pressure compressor 122 via a high pressure spool 134.

The high pressure compressor 122 is configured to drive engine accessory gearbox mounted accessories 138, such as a generator, pumps, or the like. More specifically, in addition to the above-described components, the engine 100 also includes a gearbox 140. In the depicted embodiment, the high pressure spool 134 is coupled to the engine accessory gearbox 140 via a bevel gear driven tower shaft 142. The engine accessory gearbox 140 is in turn coupled to the drive engine accessory gearbox mounted accessories 138. Thus, whenever the high pressure turbine 126 rotates, it supplies a drive force, via the engine accessory gearbox 140, to the drive engine accessory gearbox mounted accessories 138. For example, electric power is generated and supplied, for example, to the aircraft electrical distribution system for use by various other systems and components. In one specific embodiment, it will be appreciated that the drive engine accessory gearbox mounted accessories 138 may be any one of numerous types of AC or DC generators, but in a preferred embodiment it is a brushless AC generator.

The overall operation of the engine 100 is controlled via an engine controller 144. The engine controller 144, as is generally known, is used to control the output power of the engine 100 by, for example, controlling fuel flow rate to the engine 100, as well as controlling airflow through the engine 100. In the depicted embodiment, the engine controller 144 receives signals from a plurality of sensors 146 that are disposed at various locations on and within the engine 100. The sensors 146 are used to sense various physical parameters associated with the engine 100 such as, for example, various temperatures, engine speed, and air flow, and supply signals representative of the sensed parameters to the engine controller 144. The engine controller 144 processes the signals received from the sensors 146 and, among other things, supplies various commands to the engine 100 to control its operation. It will be appreciated that the engine controller 144 may be any one of numerous types of engine controllers such as, for example, a FADEC (Full Authority Digital Engine Controller). As will be described more fully further below, the engine controller 144 also controls the flow of bleed air from the engine 100. Before doing so, however, a detailed description of the remaining components depicted in FIG. 1 will be provided.

As was previously mentioned, during relatively low engine thrust operations the high pressure compressor 122 still needs to supply sufficient drive force to the drive engine accessory gearbox mounted accessories 138 to maintain the needed electrical load. Thus, air flow through the high pressure compressor 122 may be higher than what is needed to supply the desired engine thrust. As shown in FIG. 1, a pneumatically driven turbine drive system 150 is coupled to the engine 100, and is used to selectively bleed some of the air discharged from the high pressure compressor 122. As may be readily seen, the bleed air supplied to the pneumatically driven turbine drive system 150 bypasses the high pressure turbine 126 and the low pressure turbine 128, thereby reducing the thrust generated by the engine 100.

The pneumatically driven turbine drive system 150 includes a bleed air conduit 152, a flow control valve 154, and an air turbine 156. The bleed air conduit 152 includes an inlet port 158, an outlet port 160, and a flow passage 162 fluidly coupling the inlet 158 and outlet 160 ports together. The inlet port 158 is fluidly coupled to the high pressure compressor 122, and the outlet port 160 is fluidly coupled to the air turbine 156. Thus, when bleed air flows through the bleed air conduit 152, the bleed air is supplied to the air turbine 156, causing it to rotate. The bleed air conduit 152 is optionally fluidly coupled to additional bleed air sources, namely an auxiliary power unit (APU) 164 and/or a ground power unit (GPU) 166. The use of bleed air from the high pressure compressor 122 allows for use of the existing aircraft bleed air system, including these optional bleed air sources (APU 164 and GPU 166) and eliminates any need for a heat exchanger upstream of the air turbine 156 due to the low temperature of the bleed air extracted from the high pressure compressor 122. In addition, by extracting bleed air surge or discharge from the high pressure compressor 122 in contrast to extracting bleed air from the high and low pressure turbines 126 and 128, lighter weight materials, such as aluminum and titanium, may be used to form the components of the turbine drive system 150 due to the low temperature of the extracted bleed air.

The flow control valve 154 is mounted on the bleed air conduit 152 and is movable between a closed position and an open position. In the closed position, the bleed air conduit inlet port 158 is fluidly isolated from the bleed air conduit outlet port 160, and bleed air flow through the bleed air conduit flow passage 162 is prevented. Conversely, when the flow control valve 154 is in the open position, the bleed air conduit inlet 158 and outlet 160 ports are in fluid communication with one another, and bleed air flows through the bleed air conduit flow passage 162 to the air turbine 156. The position of the flow control valve 154 is controlled via valve position commands supplied by the engine controller 144. As such, the flow control valve 154 includes a valve actuator 168 that is configured to receive the valve position commands and, in response to the commands, move the flow control valve 154 to the commanded position. It will be appreciated that the commanded position may be the closed position, the fully open position, or some throttle position between the closed and fully open position.

The air turbine 156 includes a fluid inlet 170 and a rotationally mounted air turbine output shaft 172. The air turbine fluid inlet 170 is, as alluded to above, coupled to the bleed air conduit outlet port 160. The air turbine 156 is additionally coupled, via the air turbine output shaft 172, to the engine accessory gearbox 140. Thus, when the flow control valve 154 is moved to an open position, bleed air flows through the bleed air conduit 152, and into and through the air turbine 156, causing it to rotate. As the air turbine 156 rotates, it supplies a drive force to the engine accessory gearbox 140, via the air turbine output shaft 172. The drive force supplied by the air turbine 156 supplements the drive force supplied to the engine accessory gearbox 140 from the high pressure compressor 122 for driving the drive engine accessory gearbox mounted accessories 138. It will be appreciated that the air turbine 156 may be any one of numerous types of air turbines including, for example, a vaned radial turbine, a vaneless radial turbine, and a vaned axial turbine. In addition, the drive force supplied by the air turbine 156 provides power back to the engine core via a bevel gear driven tower shaft 142.

When the engine 100 is operating and the flow control valve 154 is in the closed position, the high pressure compressor 122 could back drive the air turbine 156. This could be potentially detrimental to the air turbine 156 and could additionally result in unwanted energy dissipation. Thus, as FIG. 1 additionally shows, the pneumatically driven turbine drive system 150 also includes a lock-up clutch 180. The lock-up clutch 180 is coupled between the air turbine output shaft 172 and the engine accessory gearbox 140, and is configured to selectively couple the air turbine output shaft 172 to, and decouple the air turbine output shaft 172 from the engine accessory gearbox 140. In the depicted embodiment, the lock-up clutch 180 is configured to mechanically lock in either rotational direction. The lock-up clutch 180 is coupled to receive clutch command signals from the engine controller 144. In response to the clutch command signals, the lock-up clutch 180 is configured to move to either an engage or disengage position. In the engage position, the lock-up clutch 180 couples the air turbine output shaft 172 to the engine accessory gearbox 140, and in the disengage position the lock-up clutch 180 decouples the air turbine output shaft 172 from the engine accessory gearbox 140. In the locked condition, the lock-up clutch 180 allows the pneumatically driven turbine drive system 150 to respond to changes in engine speed, such as during accelerations and decelerations. In the unlocked condition, the lock-up clutch 180 allows the pneumatically driven turbine drive system 150 to be at rest when it is not required, thereby improving bearing, gear, and seal life. In addition, when in the unlocked condition, the lock-up clutch 180 allows the pneumatically driven turbine drive system 150, and in particular the turbine 156 to remain cool without the need for purge air flow. Although the clutch command signals are preferably supplied by the engine controller 144, it will be appreciated that the commands could be supplied from a dedicated clutch controller or from a separate controller in a different system.

Having described the configurations of the engine 100 and the pneumatically driven turbine drive system 150, and the general functionality of each, a more detailed description of the overall operation and interaction of the engine and pneumatically driven turbine drive system 150 will now be provided. As noted above, the engine 100 includes various sensors 146 that sense various physical parameters associated with the engine 100, and supply sensor signals representative of the sensed parameters to the engine controller 144. The engine controller 144 additionally receives input signals representative of, for example, the thrust being commanded of the engine 100 from the cockpit. The engine controller 144, based at least in part on the sensor signals, determines the operational state of the engine 100 and supplies, among other things, appropriate command signals to the flow control valve 154 and the lock-up clutch 180, to thereby move these components to the appropriate positions.

For example, if the engine controller 144 determines that the air flow through the low pressure compressor 122 exceeds that which is needed for the commanded thrust, the engine controller 144 will issue appropriate valve position command signals and clutch command signals to move the flow control valve 154 to a desired position, and the lock-up clutch 180 to the engage position. As a result, a portion of the air discharged from the high pressure compressor 122 will be bled away from the high pressure turbine 126 and the low pressure turbine 128, and into the bleed air conduit 152. It will be appreciated that the flow rate through the bleed air conduit 152 is based, at least in part, on the commanded position of the flow control valve 154. In any case, the flow of bleed air is directed into the air turbine 156, causing it to rotate and supply a drive force to the engine accessory gearbox 140, to thereby assist the high pressure compressor 122 in driving the drive engine accessory gearbox mounted accessories 138 and provide power back into the engine core thereby moving the engine operating line away from the compressor surge. This will reduce the amount of air the turbine engine 100 will be bleeding overboard during aircraft descent (and other lower engine thrust conditions) where there is a high electrical power demand on the engine 100.

Conversely, if the engine controller 144 determines that the pneumatically driven turbine drive system 150 is not needed, the engine controller 144 will issue appropriate command signals that move the flow control valve 154 to the closed positions, and the lock-up clutch 180 to the disengaged position. As a result, no air is bled from the engine 100 and the drive force supplied to the drive engine accessory gearbox mounted accessories 138 comes solely from the bevel gear driven tower shaft 142.

The pneumatically driven turbine drive system 150 selectively supplements the power supplied to the engine accessory gearbox 140 and thus reduces the power extracted from the high pressure compressor 122. This, coupled with the bleed air that is diverted from the high pressure turbine 126 and the low pressure turbine 128, allows the low pressure spool 136 to run at lower speeds when high engine thrust is not needed or desired, but when the drive engine accessory gearbox mounted accessories 138 is still needed to supply high electrical loads. In addition, providing electrical power back into the engine 100 allows the engine core to run slower and cooler, reduces fuel consumption and reduces the engine turbine temperatures resulting in improved engine life While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine including a turbine drive system, comprising:

an engine case;

a low pressure compressor, a high pressure compressor, a high pressure turbine and a low pressure turbine disposed in flow series within the engine case, the high pressure compressor and the high pressure turbine mounted on a high pressure spool and the low pressure compressor and the low pressure turbine mounted on a low pressure spool, each spool rotationally mounted within the engine case and configured to rotate at a speed;

at least one engine accessory having an input shaft coupled to the high pressure spool to receive a drive force therefrom;

a bleed air conduit having an inlet port, an outlet port, and a flow passage therebetween, the bleed air conduit inlet port fluidly coupled to the high pressure compressor to receive a flow of bleed air from the high pressure compressor;

a flow control valve mounted on the bleed air conduit and selectively movable between at least a closed position, in which the bleed air conduit inlet port is fluidly isolated from the bleed air conduit outlet port, and an open position, in which the bleed air conduit inlet port is in fluid communication with the bleed air conduit outlet port;

an air turbine having a fluid inlet and a rotationally mounted air turbine output shaft, the air turbine fluid inlet in fluid communication with the bleed air conduit outlet port to receive bleed air therefrom when the flow control valve is in the open position, the air turbine output shaft coupled to the at least one engine accessory; and a lock-up clutch coupled between the air turbine output shaft and the at least one engine accessory and movable between (i) an engage position, in which the air turbine output shaft is coupled to the at least one engine accessory in a first rotational direction and a second rotational direction opposite the first rotational direction, and (ii) a disengage position, in which the air turbine output shaft is not coupled to the at least one engine accessory, wherein, the lock-up clutch is further configured, in the engage position, to allow the air turbine to respond to changes in the speed of the high pressure spool during both acceleration and deceleration thereof.

2. They system of claim 1, wherein the at least one engine accessory is a generator and an engine pump.

3. The system of claim 2, further comprising:
one or more gears coupled between the high pressure spool and the at least one engine accessory.

4. The system of claim 3, further comprising:
one or more gears coupled between the air turbine output shaft and the at least one engine accessory.

5. The system of claim 2, further comprising:
one or more gears coupled between the air turbine output shaft and a core of the gas turbine engine.

6. The system of claim 5, further comprising:
a fan case at least partially surrounding the engine case and spaced apart therefrom to form an air bypass section;
a fan coupled to the low pressure spool and configured, upon rotation thereof, to supply a flow of fan bypass air through the air bypass flow passage.

7. The system of claim 2, wherein the at least one engine accessory is a generator configured, upon receipt of the drive force, to generate electrical power.

8. They system of claim 7, wherein the generator is coupled to a core of the gas turbine engine to provide the electrical power thereto.

9. The system of claim 2, further comprising:
a control circuit adapted to receive one or more sensor signals representative of one or more engine parameters and operable, in response thereto, to supply one or more valve position command signals; and
a valve actuator coupled to the flow control valve, the valve actuator coupled to receive the one or more valve position command signals and operable, in response thereto, to selectively move the flow control valve to a commanded position, to thereby control the flow of bleed air to the air turbine.

10. In a gas turbine engine system including a low pressure compressor, a high pressure compressor, a high pressure turbine, a low pressure turbine, and at least one engine accessory coupled to the high pressure compressor to receive a drive force therefrom, a method of providing a pneumatically driven turbine drive system to the high pressure compressor, comprising the steps of:
sensing one or more operational parameters of the gas turbine engine system;
determining an operational state of the gas turbine engine system based at least in part on the sensed operational parameters;
selectively coupling and decoupling an air turbine to and from, respectively, at least one engine accessory via a lock-up clutch that is configured to allow the air turbine to respond to changes in the speed of the high pressure compressor during both acceleration and deceleration thereof; and
selectively supplying air discharged from the high pressure compressor to the air turbine based at least in part on the determined operational state, whereby the air turbine rotates and supplies the drive force to the at least one engine accessory in addition to that provided by the high pressure compressor.

11. The method of claim 10, wherein:
the at least one engine accessory is a generator or an engine pump.

* * * * *